(No Model.) 4 Sheets—Sheet 1.
W. C. DOLLENS & G. H. ZSCHECH.
MACHINE FOR HARVESTING SUGAR CANE.
No. 269,513. Patented Dec. 26, 1882.
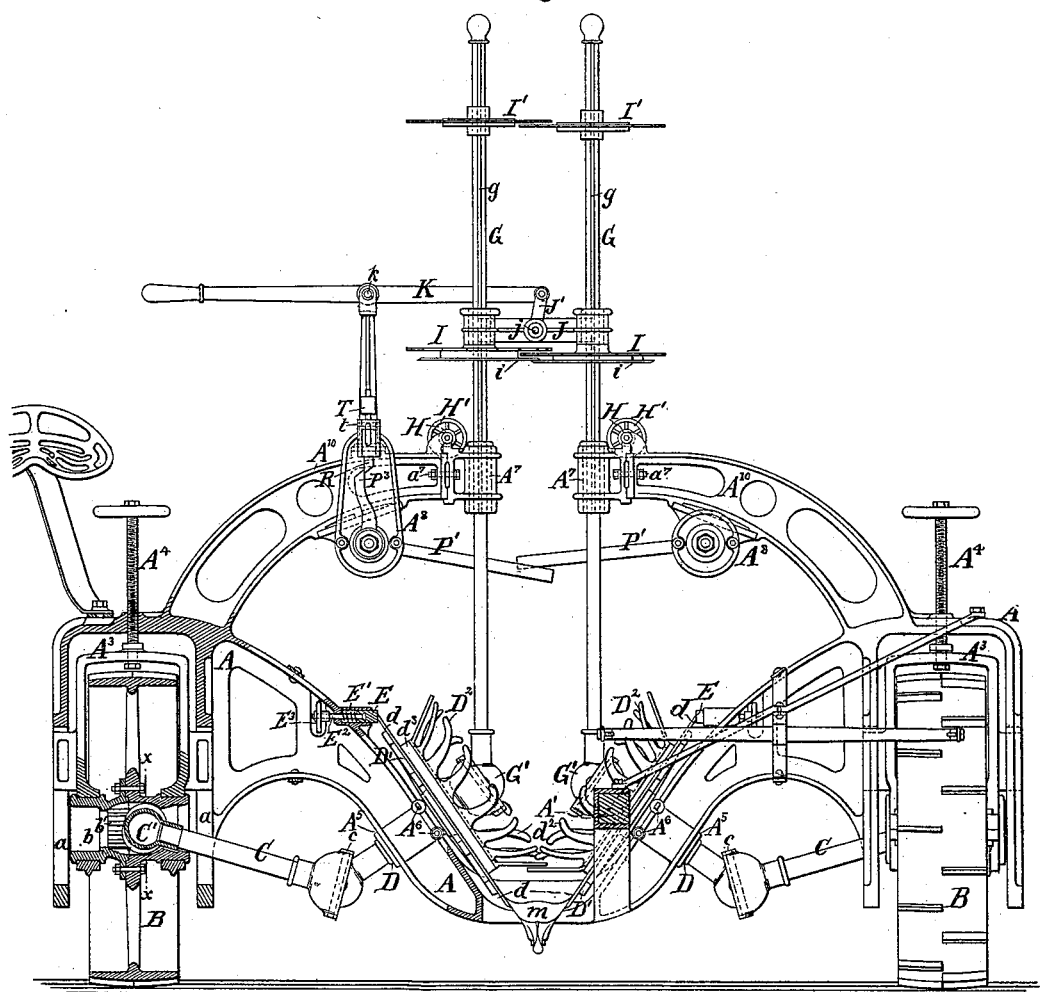
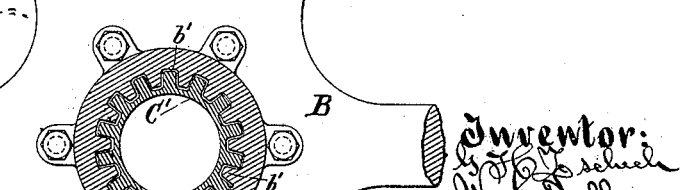
Witnesses:
M. F. Boyle.
H. A. Johnstone.
Inventor:
G. H. Zschech
W. C. Dollens
by his attorney
T. S. Stelen

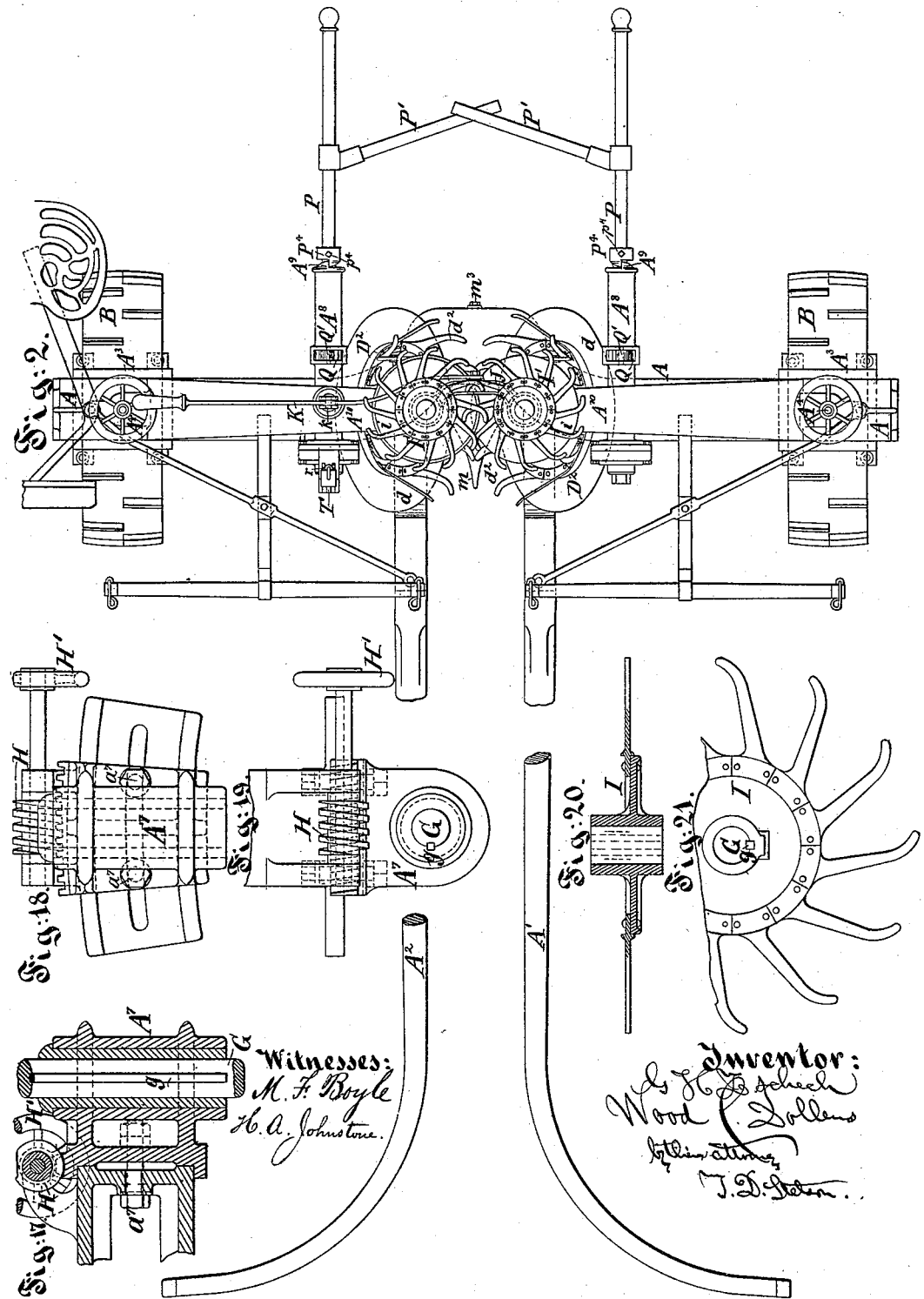

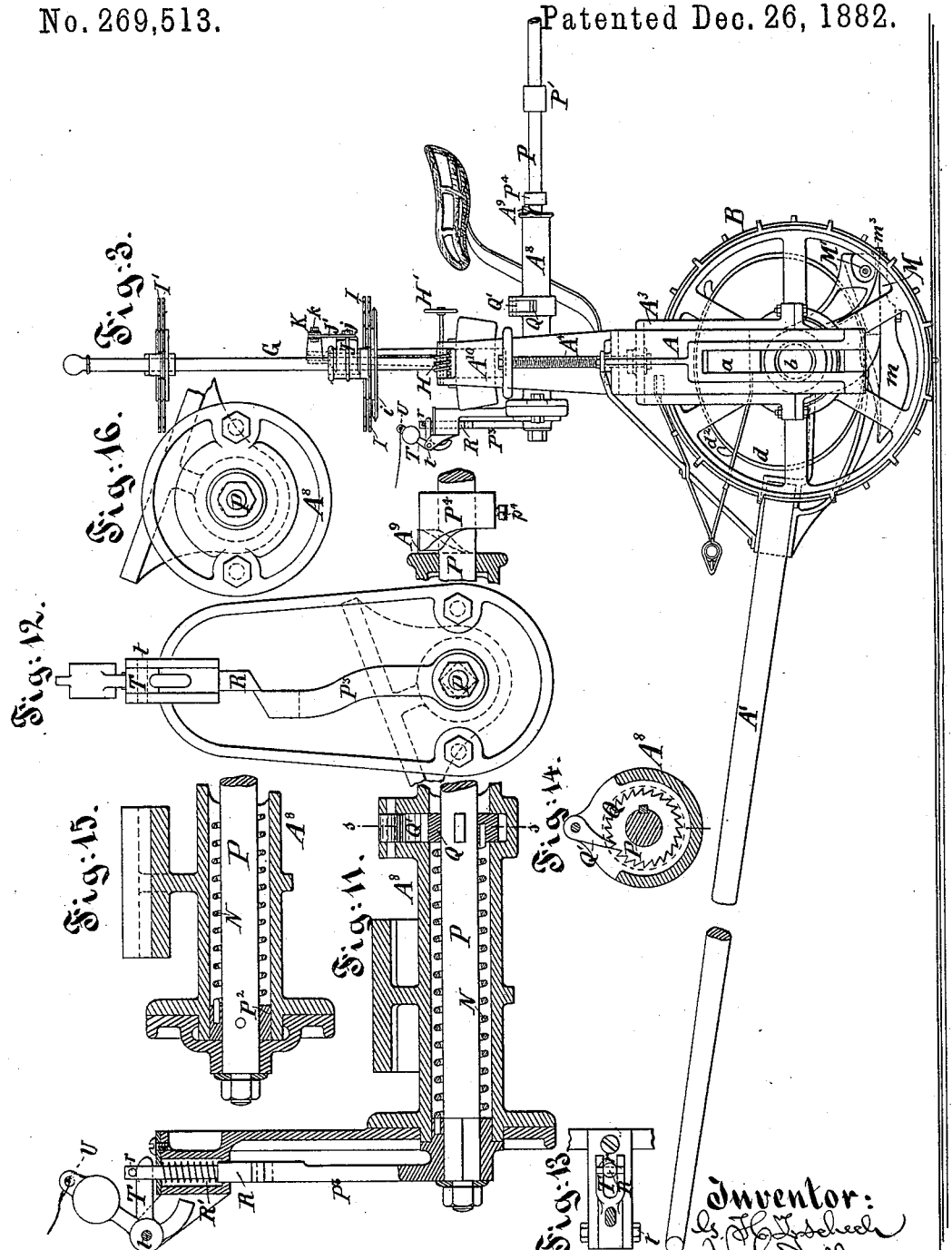

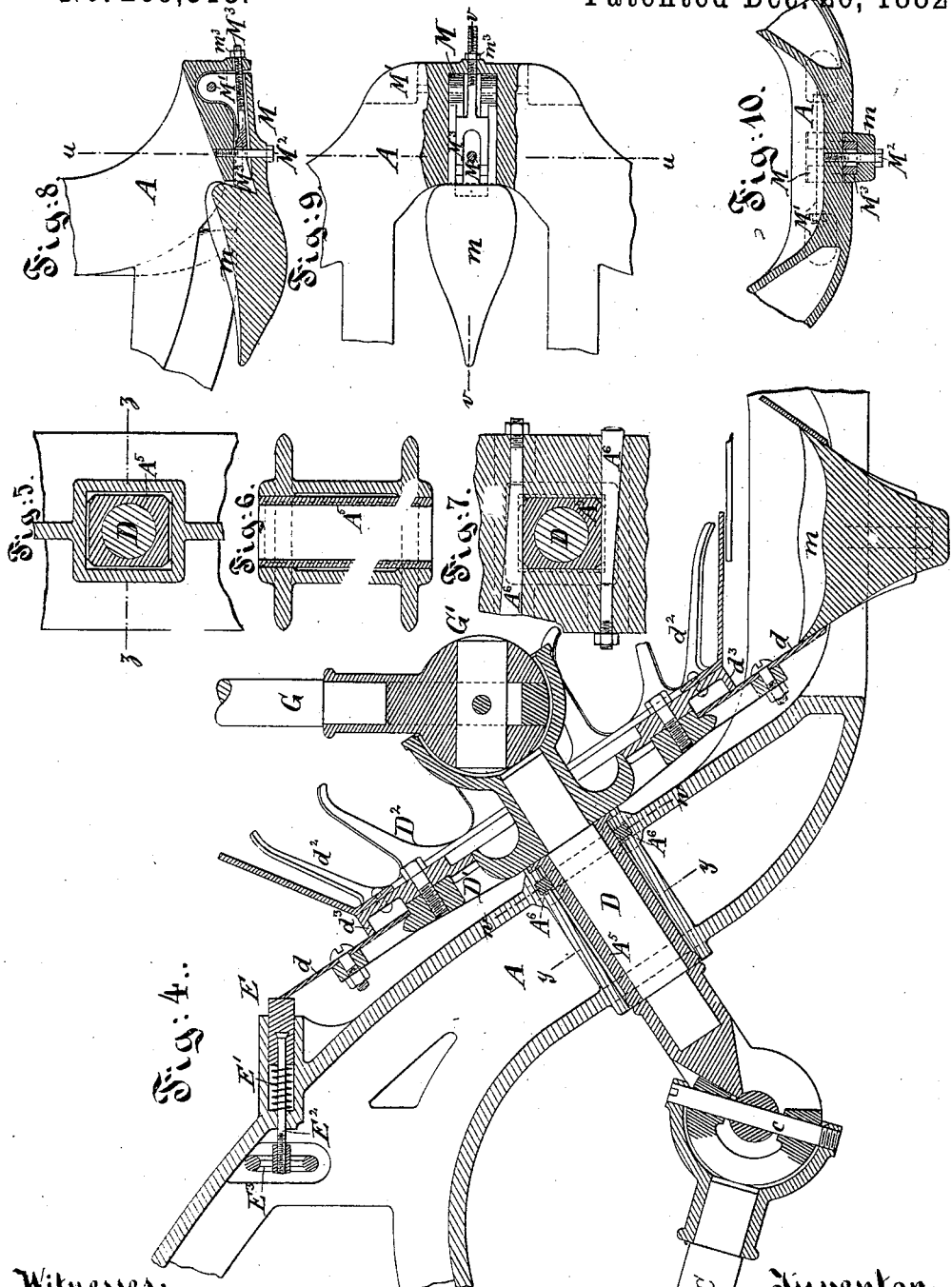

UNITED STATES PATENT OFFICE.

WOOD C. DOLLENS AND GUSTAVUS H. ZSCHECH, OF INDIANAPOLIS, INDIANA, ASSIGNORS TO ALBERT GALL, OF SAME PLACE.

MACHINE FOR HARVESTING SUGAR-CANE.

SPECIFICATION forming part of Letters Patent No. 269,513, dated December 26, 1882.

Application filed April 12, 1882. (No model.)

*To all whom it may concern:*

Be it known that we, WOOD C. DOLLENS and GUSTAVUS H. ZSCHECH, both of Indianapolis, Marion county, in the state of Indiana, have invented certain new and useful Improvements Relating to Machines for Harvesting Sugar-Cane and Analogous Crops; and we do hereby declare that the following is a full and exact description thereof.

Our machine may be used with some success for harvesting Indian corn and various other crops; but we will describe it as adapted and applied for harvesting sugar-cane.

The machine is adapted to be drawn by two horses or other animals walking one on each side of the row of canes to be cut. Two poles are employed mounted at a little distance apart, each curved outward at the forward end to serve as means for gathering the canes together. We provide for cutting off the several canes close to the ground by the aid of revolving shears, and a stationary knife accompanying the shears by a series of revolving fingers constituting a reel. We provide for steadying and gathering together the canes at higher levels, and urging them through the space between the cutters by means of reels; also for allowing for varying the inclination of the shafts on which such reels are carried; also for cutting off the upper portion of the canes in which there is little or no sugar. We provide for a constant whetting of the knives to maintain the proper sharp condition, and for numerous adjustments of the several parts; also means for holding the canes on the machine until a considerable number have accumulated, and then dropping them in a bunch and causing the parts to again promptly resume their original position and be firmly held until a movement is made to again liberate them. We construct the reels, which serve to urge the stalks toward the revolving knives and through the machine, in such manner that the separate fingers or arms of the same can be easily replaced in case of breakage.

The following is a description of what we consider the best means of carrying out the invention.

The accompanying drawings form a part of this specification.

Figure 1 is a general front elevation of the entire machine, partly in section. Fig. 1$^a$ is a section through a detail on the line $x$ $x$, Fig. 1, on a large scale. Fig. 2 is a plan of the entire machine. Fig. 3 is a side elevation of the same. Figs. 1, 2, and 3 are all on the same scale. The remaining figures show details on larger scales. Fig. 4 is a vertical section through a part of the machine. Fig. 5 is a cross-section on the line $y$ $y$, Fig. 4. Fig. 6 is a longitudinal section on the line $z$ $z$, Fig. 5. Fig. 7 is a cross-section on the line $w$ $w$, Fig. 4. Figs. 8, 9, and 10 show the adjustment of the stationary knife. Fig. 8 is a vertical section on the line $v$ $v$, Fig. 9. Fig. 9 is a plan partly in section. Fig. 10 is a vertical transverse section on the line $u$ $u$, Figs. 8 and 9. Figs. 11 to 16 represent the dropping mechanism detached from the machine. Fig. 11 is a central vertical section of the parts mounted on one side of the machine. Fig. 12 is a front elevation thereof. Fig. 13 is a plan of part of the same. Fig. 14 is a transverse section on the line $s$ $s$, Fig. 11. Fig. 15 shows the front end of the corresponding parts mounted on the other side of the machine. Fig. 16 is a front elevation thereof. Figs. 17 to 21 show certain parts of the mechanism for urging the stalks backward through the cutters and out of the machine. Fig. 17 is a vertical section, showing the means for adjusting one of the reel-shafts. Fig. 18 is a side elevation of the same, and Fig. 19 is a plan thereof. Fig. 20 is a vertical section through one of the reels, and Fig. 21 is a plan of a portion of a reel.

Similar letters of reference indicate corresponding parts in all the figures.

A A' A$^2$ is the frame-work of the machine. A' A$^2$ are slightly divergent and curved poles. We take care to so arrange the means for attaching the animals that there shall be nothing on the inner edges of these poles to interfere with the smooth guidance of the canes along the surface.

A$^3$ A$^3$ are portions of the framing, on which the main frame A is adjustable, being guided by slots $a$, as indicated in Figs. 1 and 3. The machine is adjustable up and down on the parts A$^3$ by means of the screws A$^4$, tapped through the portion A and collared in the part A$^3$.

B B are stout bearing-wheels, serving also as driving-wheels for the machinery. They are formed with hollow tubular hubs or centers $b$, supported in suitable bearings in the portions $A^3 A^3$. The interiors of the hubs are formed with teeth $b'$, extending longitudinally or parallel to the axis.

C C are shafts, each terminating at the outer end in a spherical casting, $C'$, having teeth which engage with the teeth of the interior of the corresponding wheel-hub. The other and inner end of each shaft C is equipped with a cup-shaped casting, carrying a sufficient transverse pin, $c$, which extends through a thicker transverse pin, mounted with suitable accompanying parts at the outer end of the correspondingly-inclined shaft D. The union of the shafts C and D, by the aid of the pin $c$ and the accompanying parts, constitutes a universal joint.

When the main framing A of the machine is raised or lowered by the turning of the screws $A^4$ the shaft C changes its angular position within wide limits. The shafts D, on the contrary, are supported in tubular bearings $A^5$, which are mounted in the framing A, and are not capable of changing their angular position except for the purpose of adjustment. When the machine is working their angular position cannot vary, and consequently the distance between the universal joints $c$ does not change. The distance between the driving-wheels B also is invariable. Consequently when the main framing A of the machine is raised or lowered the ends $C'$ of the shafts C must extend more or less into the hollow hubs $b$. For this reason the connection between the driving-wheels B and shafts C must be made self-adjusting, and this end is obtained by the use of the spherical toothed casting $C'$ and the elongated internally-toothed hub $b$. The lower and outer end of each sleeve $A^5$ fits tightly in the recess between stout supporting-surfaces in the main framing A. The upper and inner end, on the contrary, has liberty for a limited amount of motion. It is supported between two stout tapering keys, $A^6$, which are fitted in corresponding seats, and, being driven in one direction or the other, adjust the position of the sleeve and consequently the inclination of the shaft D and the position of the knives $d\ d$, hereinafter described.

On each shaft D is carried a wheel, $D'$, which supports and rotates a circular knife, $d$. On the upper and inner face of each knife $d$ is a reel, $D^2$, having a rim, $d^3$, which presses fairly against the knife $d$ near the periphery of the latter, and peculiarly-formed fingers $d^2$, reaching outward in inclined positions, as indicated in Figs. 1, 2, and 4. The two inclined rotary knives $d\ d$ run with their lower portions in shearing contact with a stationary knife, $m$, a portion, M, of which projects backward and is attached to the fixed frame-work A. Its forward end is rounded and adapted to separate the several canes as they are successively crowded against it while the machine is moved rapidly forward. All the canes which are carried to one side of this stationary knife are sheared off by the contact of the knife $d$ on that side. All the canes which are carried to the other side are sheared off by the contact of the other knife $d$. The fingers $d^2$, by rotating with the knives $d$, engage with the several canes and insure their prompt movement across the cutting-space. By the tilting of the shafts D the distance apart of the knives $d\ d$ is varied separately or together, and the level of the knives $d\ d$ changed.

E E are sharpening-blocks, of emery or analagous material, mounted in housings provided in the fixed framing adjacent to the upper edge of the knife. The outer face of each block E bears against the beveled periphery of its knife, and is pressed forward by the spring $E'$. The sharpening-block can be drawn back against the force of the spring when desired by means of a screw-bolt, $E^2$, and a nut or threaded hand-wheel $E^3$. It is important that the center knife, $m$, be capable of adjustment with nicety.

Referring to Figs. 8, 9, and 10, the under side of the fixed framing A is recessed to receive an axial bolt, $M'$, on which the knife-support M is mounted with freedom to turn up and down.

$M^2$ is a bolt tapped into the framing A, and capable of drawing the knife-support M upward very firmly.

$M^3$ is a wedge-bolt extending through a lug cast on the central part of the frame A. This bolt is adjusted by means of a nut, $m^3$, abutting against said lug at the rear end. The forked wedge part of the bolt $M^3$ applies between corresponding oblique surfaces on the under side of the framing A and on the upper side of the knife $m$. By properly raising and lowering the knife the relations of its edges to the revolving knives $d$ may be changed to attain the best conditions. To raise M the nut $m^3$ is slackened. Then the wedge-bolt $M^3$ is driven forward, and then the bolt $M^2$ is tightened. To lower the knife the bolt $M^2$ is slackened and the nut $m^3$ turned to draw the wedge-bolt $M^3$ rearward. When this has lowered the knife a little the screw $M^2$ is again tightened. It is well to set both the screw $M^2$ and the nut $m^3$ very firmly when the right adjustment is secured.

The shafts D are each extended inward and upward beyond the knives $d\ d$ and their accompanying parts, and each is connected by another universal joint, $G'$, to the upright or nearly upright shaft G, which is supported in adjustable bearings $A^7$ and mounted at a suitable elevation, and controlled by guiding and retaining bolts $a^7$, and the endless screw or worm H, turned by the hand-wheel $H'$. The adjusting-screws H can set the bearings $A^7$ forward and backward within wide limits, thereby correspondingly changing the inclination of the shafts G. These shafts require to be set forward or backward considerably under some conditions, especially when the canes are strongly inclined in one direction in consequence of a high wind or from any other cause. Care should be taken to set both shafts G at the same inclination forward or backward. The bearings $A^7$ are held in smooth sliding contact with the faces of the adjacent parts of the fixed framing by means of the bolts $a^7$, which slide in slots formed in the fixed parts, as shown. These shafts G above the bearings $A^7$ are longitudinally grooved or splined, and receive each a feather, $g$, which secures a wheel or reel, I, to which is firmly secured a circular cutter, $i$. Both the wheels I are mounted in a movable yoke, J, connected at the joint $j$ by the link J' to a hand-lever, K, turning on a fixed center, $k$, and subject to the control of the attendant. By turning the lever K on its center $k$ the yoke J and consequently both the knives $i$ and reels I are equally raised and lowered. It will thus be seen that the two knives $i$, mounted one on each shaft G and turned thereby in opposite directions, cut shearwise, each across the edge of the other; also, that the fingers on the edges of the reels or wheels I just above them seize the several canes as they are brought by the motion of the machine into their embrace, and hold them firmly and compel their continuous traverse across the cutting-space. The attendant raises or lowers the upper cutters, $i$, so as to as nearly as may be remove the proper amount of waste from the tops of the canes which remain on the field. The lower and valuable portions of the several canes are retained on the machine for a greater or less period until a sufficient number have accumulated to make one convenient bunch or bundle. This is effected by means of the arms P' P', fixed on partially-rotating shafts P, supported in stationary bearings in a portion, $A^8$, of the fixed frame-work.

A coiled spring, N, surrounds the shaft P in the space provided between it and the inclosing casing $A^8$. One end of this spring N engages with a hub, $P^2$, fixed on the shaft P. The other end of the spring engages with a ratchet-wheel, Q, which is adjustable when required, and held in the desired position by the pawl Q'. By this means the force of the spring N may be adjusted with the required degree of nicety. There is sufficient length to the coiled spring N to allow a liberal turning motion to the shaft P. The tension of the spring should be so adjusted that when a sufficient quantity of cane has by the action of the machine been cut off and caused to lie on or to strongly press against the arms P', the weight thereof is sufficient to turn the respective shafts P in opposition to the force of the spring N, and cause the discharge of the bunch or bundle in a mass upon the ground, yet there should be sufficient tension to the springs to turn the shafts P, with their respective arms, promptly back again to the position for receiving more canes as soon as the bundle is thus delivered. The arms P' are set at such angles in their respective shafts P that they cross each other. The coiled spring N around one shaft, P, is adjusted more stiffly than that around the other. It follows that immediately on the delivery of the bundle of canes one of the arms P' rises promptly to its place, and the other follows more tardily. Thus that arm with the weaker spring is certain to lie under the other. It supports the other. The locking of the shaft which carries the undermost of these two arms P causes the undermost to support the other. Its release releases both. The shaft P carrying that arm shown in these drawings, as that on the left side of the machine, has an arm, $P^3$, formed with a beveled end, as indicated in Figs. 1, 3, 11, and 12. When the respective bars P' are in position for receiving cane, the arm $P^3$ is held rigidly by a sliding catch, R, correspondingly beveled, mounted, and free to slide vertically in the frame-work. This catch R is urged downward by a spring, R', inclosed in the framing.

T is a weighted lever, turning on a fixed center, $t$, and engaging under a cross-pin, $r$, in the slide R.

To the upper arm of the lever T is attached a cord, U, by pulling which at intervals the attendant can turn the lever T and raise the slide R sufficiently to liberate the arm $P^3$, care being taken to do this only when there is a sufficient load of canes lying on the arms P' much greater than can be supported by the tension of the springs N. The pulling of the cord U results in the partial rotation of both shafts P and the discharge of the bundle of canes with the prompt return first of the arm P' on the right-hand side of the machine and immediately after of the arm P' on the left side, the beveled end of the arm $P^3$ lifting the sliding catch R and being engaged by it so soon as it has passed.

It is obviously important to provide against the rise of the arms P' too high. This is accomplished by a stop or dog, $P^4$, on each shaft P, engaging with a stop, $A^9$, on the part $A^8$ of the fixed frame-work. Each dog $P^4$ is held on the shaft P by a pinching-screw, $p^4$, so that it can be adjusted to regulate the stopping of the arms P' at such height as may be desired.

We construct the lower reels, D, as well as the upper reels, I I', with their fingers separate from the central part or main body, and rivet, bolt, or otherwise fasten these fingers to the central part, as shown in Figs. 4, 20, and 21. This enables us to easily repair such reels in case of breakage of one or more of their fingers by simply removing the broken fingers and supplying new ones, a number of which may always be kept on hand.

Modifications may be made in many of the details.

We can use other forms of universal joint than those shown.

We can increase or diminish the number of the teeth in the interior of the wheel-hubs $b$, correspondingly modifying, of course, the toothed knobs on the outer ends of the shafts C. We can enlarge or otherwise change the diameter of those parts, and can change the dimensions and proportions of many of the other parts.

We can employ any number of reels or spiderarmed devices on the shafts G, above or below the upper revolving cutters I $i$. We have shown one pair, I', of such.

It will be observed that as the cutting devices on the respective sides are driven independently by their respective driving-wheels, the motions do not always correspond, and in some cases—as in traversing curves, and especially turning sharp short corners—the motions of the cutting devices on the two sides are very unequal, or even possibly in opposite directions. It is therefore important to arrange them so that one can turn independently of the other. We allow this by mounting the reel or reels on one side sufficiently higher than the reel or reels on the other side to allow each to revolve freely without contact with the other, while they are sufficiently near to act as a unit on the canes which are received and moved by them.

We can provide for automatically insuring a correct adjustment of the upper cutters relatively to each other by mounting one with liberty to move or yield up and down on the shaft, being urged into gentle but sufficiently forcible contact with the other by a spiral or other spring; but we do not esteem such generally necessary.

We claim as our invention—

1. In a harvester, the framings $A^3$ $A^3$, inclosing and resting on the wheels B, in combination with said wheels, and with the main framing A, and with the screws $A^4$, arranged to change the relation of the parts, substantially as herein specified.

2. In a harvester having revolving knives $d$, mounted on shafts D, with connections for rotating them, the adjustable sleeves $A^5$, forming bearings for said shafts, and adjusting-keys $A^6$, combined and arranged to serve as herein specified.

3. In a harvester, the wheels B, having hollow hubs $b$, with internal teeth or ribs, $b'$, in combination with the shafts C, having the correspondingly-ribbed spherical heads C', adapted for joint operation, as herein specified.

4. In a harvester having driving-wheels B and knives $d$, with provisions for changing their relative levels, as specified, the separate lengths of shaft C D, connected by universal joints to each other and to the wheels, as herein set forth.

5. In a harvester, the combination of the two inclined rotating knives $d$, the driving connections therefor, the keys $A^6$, for changing the positions of the knives within certain limits, as shown, a tilting center knife, $m$ M, turning on an axis, M', and screw $M^2$ and key $M^3$ for adjusting and holding said knife, as herein specified.

6. In a harvester, the combination of a revolving knife, $d$, a sharpening device, E, and a yielding spring, E', arranged to serve as herein specified.

7. In a harvester, the combination of the revolving knife $d$, the reel, mounted on the front of said knife, having a rim, $d^3$, pressing on the knife, as and for the purposes herein specified.

8. In a harvester, the revolving knives $d$ and shafts G, extending upward above the said knives, in combination with the universal joints G' for driving such shafts, the reels I for seizing and moving the cane or other material treated, and the upper revolving knives, $i$, arranged to cut off the tops of the material, all substantially as herein set forth.

9. In a harvester having revolving knives $d$ and shafts D and G, extending up and down, connected thereto, the adjusting-screw H and retaining-bolts $a^7$, adapted to set the shafts G at varying inclinations, as herein specified.

10. In a harvester, the combination, with cutters, as $d$ $m$, for cutting off the canes or analogous material, of shafts P, having arms P' and springs for moving and locking, and a tripping device for holding and releasing the shafts, all substantially as herein specified.

11. In a harvester, the arms P' P', arranged to cross each other and the springs N N, so that one shall be certain to bring its arm P' into position later than the other after each discharge of cane, in combination with a locking and tripping device, whereby one tripping device will control both arms, all substantially as herein specified.

12. The lower cutters, $d$, and their impelling means, the shafts G, extending upward therefrom, the reels I and the upper cutters, $i$, revolved by such shafts, and adapted to be raised and lowered thereon, in combination with the connecting-yoke J and operating-lever K, to adjust the height at which the tops of the canes are cut off, substantially as herein specified.

13. In a harvesting-machine, reels for urging the stalks through the machine composed of a central part or disk, and projecting fingers fixed thereto, in combination with means for imparting motion to the reel-shafts, and with suitable cutters, mounted on the same shaft therewith, for cutting the stalks as the machine advances and the stalks pass through said reels, substantially as and for the purposes herein specified.

14. In a harvesting-machine, the two inclined circular cutters $d$ and stationary central knife, $m$, in combination with the sleeves $A^5$, carrying the shafts for the circular cutters and their supporting-wheels, in combination with the wedge-shaped keys $A^6$, a suitable casing for the said sleeves, and suitable means for operating the cutter-carrying shafts, substantially as and for the purposes herein specified.

In testimony whereof we have hereunto set our hands at Indianapolis, Indiana, this 24th day of March, 1882, in the presence of two subscribing witnesses.

WOOD CLEVELAND DOLLENS.
GUSTAVUS HERMANN ZSCHECH.

Witnesses:
CHARLES C. STETSON,
JOHN W. CLAYPOOL.